United States Patent [19]

Glassmacher et al.

[11] Patent Number: 5,329,570
[45] Date of Patent: Jul. 12, 1994

[54] COPY PROTECTION OF SOFTWARE FOR USE IN A PRIVATE BRANCH EXCHANGE SWITCH

[75] Inventors: Joseph F. Glassmacher, Princeton Junction, N.J.; Joseph M. Greene, Nazareth, Pa.; Martin R. Kester, Mt. Olive Township, Morris County; Joseph L. LaCava, Colts Neck, both of N.J.

[73] Assignee: AT&T Bell Laboratories, Murray Hill, N.J.

[21] Appl. No.: 984,802

[22] Filed: Dec. 3, 1992

[51] Int. Cl.⁵ .......................................... H04M 3/00
[52] U.S. Cl. .................................... 379/189; 379/198
[58] Field of Search ............... 379/196, 197, 198, 189

[56] References Cited

U.S. PATENT DOCUMENTS

| | | | |
|---|---|---|---|
| 4,064,372 | 12/1977 | Altenburger | 379/196 |
| 4,661,974 | 4/1987 | Boles | 379/198 |
| 4,955,047 | 9/1990 | Morganstein | 379/198 |
| 5,099,511 | 3/1992 | Matsumoto | 379/198 |
| 5,274,698 | 12/1993 | Jang | 379/198 |

Primary Examiner—James L. Dwyer
Assistant Examiner—Michael N. Lau
Attorney, Agent, or Firm—Samuel R. Williamson

[57] ABSTRACT

An inexpensive software copy protection arrangement prevents the unauthorized use of customized software for a private branch exchange switch. The arrangement employs a process which recognizes the signature of typical unauthorized activities and freezes the administration capability of the private branch exchange switch when such signature is detected. By freezing the administrative capabilities, the addition, removal or change of an administrative port, extension or routing pattern on the private branch exchange switch is prevented.

25 Claims, 2 Drawing Sheets

COPY PROTECTION OF SOFTWARE FOR USE IN A PRIVATE BRANCH EXCHANGE SWITCH

BACKGROUND OF THE INVENTION

1. Technical Field

This invention relates to copy protection of software and more particular to copy protection of software for use in a private branch exchange switch.

2. Description of the Prior Art

Today's private branch exchange (PBX) switches are relatively complex systems that require extensive customized software to handle the many features available to users operating telecommunications equipment within these systems. This software is normally acquired by a purchaser from a vendor or manufacturer of the system through the purchase of a software license when the PBX switch is initially installed, or when subsequent upgrades to the software are acquired.

A secondary market has evolved for some PBX switches. In this market, a pirate purchases the switch from a legitimate owner, receives physical possession of the customized software for the switch and relocates the switch in a different central office serving area. The pirate next attempts to use the customized software for the switch in violation of the software licensing agreement between the vendor or manufacturer of the switch and the original purchaser of the switch. The impact of this secondary market can easily amount to hundreds of thousands of dollars in loss revenue to developers of customized software for PBX switches.

A number of software locking arrangements have emerged for guarding against software piracy of customized software for use with a PBX switch. A first well-known arrangement is the hardware key arrangement. The hardware key arrangement requires firmware that plugs into a processor that is associated with the switch software. The firmware is designed to be difficult to clone and to reverse engineer. The copy protection is provided by virtue of the difficulty in reproducing the firmware or hardware key.

A second well-known arrangement for the protection of customized software for use with a PBX switch is the license manager arrangement. The license manager arrangement is a software based arrangement wherein the vendor embeds encrypted registration information in the customized software. This registration information may be, for example, either the customer's licensed serial number or the customer's site location. Any attempt to operate without entering this encrypted registration information results in the protected program ceasing to operate.

Although both of these software locking arrangements provide reasonable protection against the unauthorized use of customized software for a PBX switch appearing on the secondary market, each of these arrangements have significant implementation costs as well as continuing administration costs. This is due mainly because of the requirement for maintaining and staffing databases for these arrangements at the PBX vendor's centralized locations.

SUMMARY OF THE INVENTION

In accordance with the invention, an inexpensive software copy protection arrangement which prevents the unauthorized use of customized software for a PBX switch is provided. The arrangement advantageously permits the making of backup copies of the customized software for use on the originally designated PBX switch.

In preferred embodiments, the arrangement employs a process which captures the signature of typical pirate activities and freezes the administration capability of the PBX switch when the signature is recognized. An example of a typical pirate activity is the movement of a PBX switch purchased on the secondary market from the service area of a first central office to the service area of another central office which may or may not be located in a different area code. Since such a movement always involves the purchase and negotiation of direct inward dial numbers and trunks, administrative changes to the dial plan of the PBX switch are necessary. Thus, in accordance with the invention, these attempted administrative changes provide the signature that is used for triggering the freeze of the administration capabilities.

In a first aspect of the invention, a change in an area code is used by the process as an independent indicator for generating the freeze of the administration capabilities. A change in the dial plan provides a second independent indicator for use by the process for generating the freeze of the administration capabilities. Thus, if either of these indicators are true, the freeze of the administration capabilities occurs with any designated administrative change or reconfiguration of the PBX switch.

In a second aspect of the invention, to allow for uninterrupted operation for a customer located in, by way of example, one of those metropolitan areas where area codes change periodically, the process advantageously may be configured to freeze the administration capabilities only when both indicators, i.e., the change in area code and the change in dial plan, are true.

BRIEF DESCRIPTION OF THE DRAWING

The invention and its mode of operation will be more clearly understood from the following detailed description when read with the appended drawing in which.

DETAILED DESCRIPTION

Figure 1:
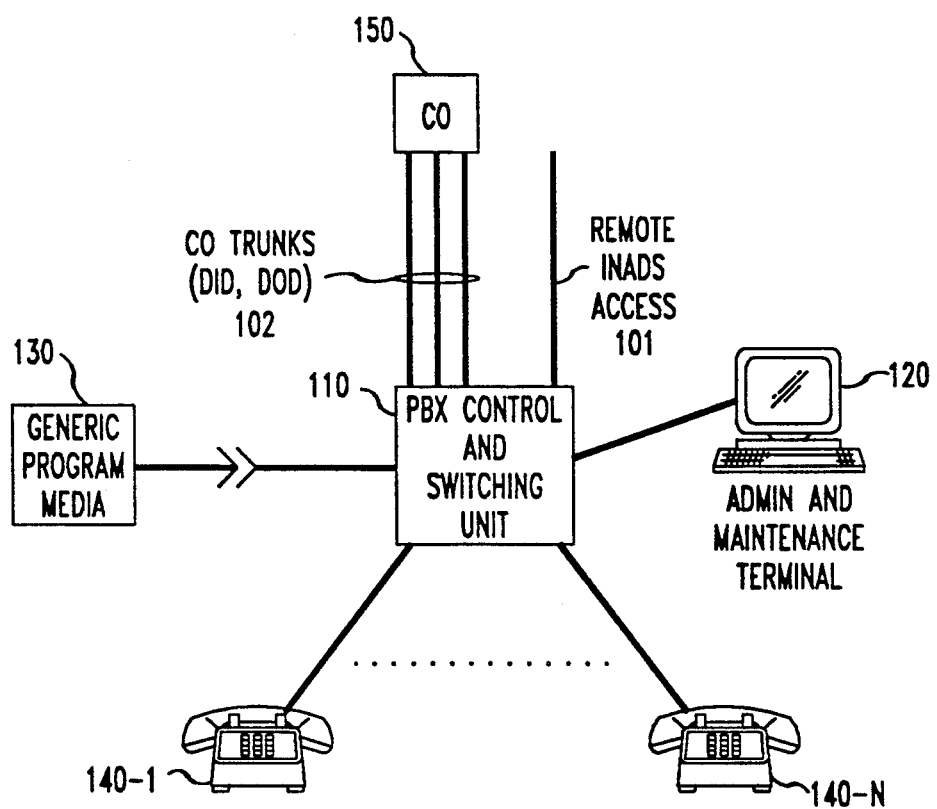
FIG. 1 shows a block diagram of a PBX switch suitable for incorporating a process for preventing the unauthorized use of customized software therein, in accordance with the invention.

Referring now to FIG. 1, there is shown, in accordance with the invention, a block diagram of a PBX switch suitable for incorporating the process for preventing the unauthorized use of customized software therein. PBX switches are well known in the art. Examples of such switches in which the invention easily may be incorporated are the Definity ® PBX (Generic 1) and System 75, both manufactured by AT&T.

The PBX switch generally comprises a control and switching unit 110, an administration and maintenance terminal 120, a generic program media 130 and a plurality of telephone stations 140-1 through 140-N. The control and switching unit 110 is driven by a stored program contained in the generic program media 130 which may illustratively comprise a separate tape or cartridge. Software security for this stored program may be provided through one of the known software protection arrangements which provide, for example, program file encryption and also disassemble and debugging traps to prevent alterations or reverse engineering. The administration, maintenance and loading of the generic program media 130 is executed by the administration and maintenance terminal 130 which includes remote capabilities for operational service support via a special central office line 101 to an initialization and administration system (INADS).

The PBX control and switching unit 110 switches calls between telephone stations 140 and also between these telephone stations and a central office 150 via trunks 102. These trunks 102 can be of two types. Direct inward dial (DID) and direct outward dial (DOD) trunks. As is well known in the art, the DID trunks are assigned from numbers which are allocated by the local central office provided by the local exchange carrier. The DID trunks also allow telephone stations assigned numbers within the PBX switch to be addressed with a 7-digit number as if these telephone stations were assigned directly to the central office.

In operation by way of illustrative example and in accordance with the invention, the PBX switch includes a software security system for restricting execution of the customized software to a particular service area provided by a specific central office, for example, central office 150.

A set of indicators are stored in the generic program media 130 which are indicative of the PBX switch operating in the particular service area provided by the specific central office. Examples of such indicators are an area code and a dial plan, i.e., the numbers provided on the DID and DOD trunks 102 for the PBX switch. Each of these indicators in the stored set must compare favorably with each of other comparable indicators that are present in the customized software during the execution of the customized software. These other comparable indicators are unique to the service area for each central office in which the switch operates.

When the comparable indicators, present in the customized software during the execution of this customized software, do not favorably compare with those indicators contained in the stored set, the customized software which configures the administration capabilities is prevented from further execution on the PBX switch. This is achieved through a process, described later herein, which freezes all administration capabilities of the PBX switch prohibiting any additional changes to the PBX switch. These administration capabilities may be unfrozen by the operational service support available from INADS.

Figure 2:
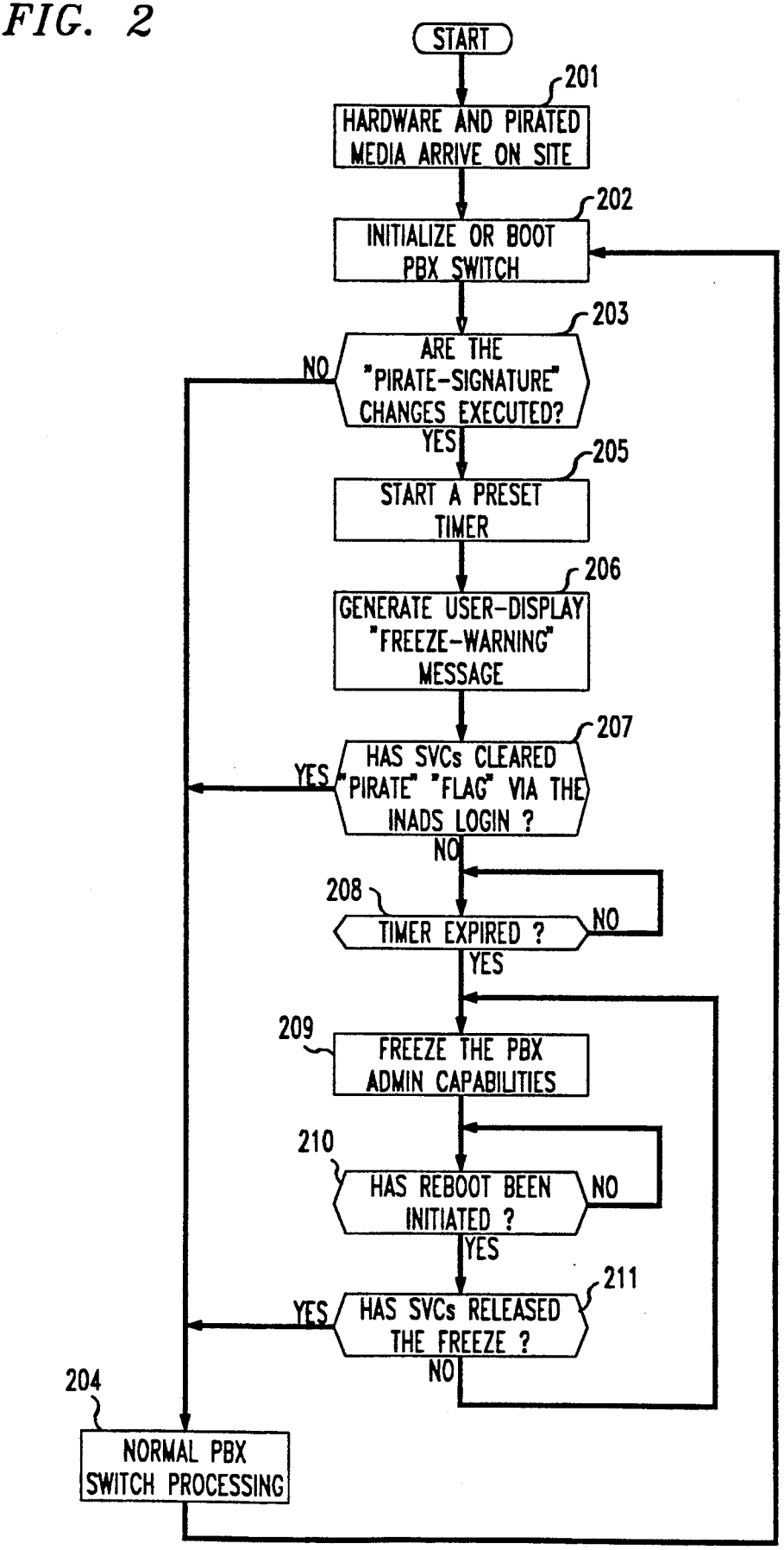
FIG. 2 is a flow chart illustrating the operation of the software protection process in preventing the unauthorized use of customized software for a PBX switch, in accordance with the invention.

Referring next to FIG. 2, there is shown a flow chart illustrating the operation of the software protection process in preventing the unauthorized use of customized software for a PBX switch, in accordance with the invention. When the PBX switch is relocated in a service area different from the area in which it was initially placed in service, the process is triggered by the pirated signature which was, in turn, generated by any attempts to initialize and reconfigure the PBX switch in the different service area. The process then freezes the administration capabilities as described next with reference to FIG. 2. The functions performed by the control and switching unit 110 are advantageously determined by a process or program contained in the generic program media 130.

The hardware and pirated media arrive on site in step 201 and the the process is entered at step 202. At the step 202, the normal initialization of the PBX switch is begun. The process remains in a wait state for the unauthorized user to make any administrative changes in decision 203 that constitute the pirate signature. Such changes are, for example, any addition, removal or change of administratable ports, dial plans, trunk routes, names, buttons, extensions or a routing pattern on the PBX switch. If the pirate signature is not recognized or detected in the decision 203, then the PBX switch enters a normal operating state shown by step 204, where it then resides until interrupted for maintenance, upgrading or the like. If the piracy signature is recognized, however, the process starts a preset timer depicted in step 205 which times out in, for example, two hours. Once the timer is activated, a display of an imminent freeze warning message, depicted in step 206, is generated on the user's administration and maintenance terminal 120, shown in FIG. 1. The user then has the option of calling the operational support system personnel and reporting this condition, which he or she will do if a legitimate user. Thus if the person initializing or booting up the PBX switch is a legitimate user, the operational support system personnel is called and the pirate flag is cleared via the INADS login in decision 207.

The INADS login is a special login and includes the required privileges in the PBX switch which allow the clearing of the pirate flag and resumption of the normal PBX switch operation. In the implementation of the clearing of the flag, only the privileged INADS login may be used. And this login is available only to the operational support system personnel. This clearing of the flag may be achieved in two ways. If the unauthorized user provides access to a central office line such as, for example, line 101, the clearing may be accomplished remotely by the operational support system or the operational support system can dispatch a technician to do the clearing on site.

If at decision 208, the timer depicted in step 205 expires with no intervention in decision 207 from the operational support system services, the process freezes the PBX switch's administration capabilities at step 209 allowing no addition, change or removal of any administrable quantity. From step 209, the process advances to decision 210 where it is determined if a reboot has been initiated. If not, the process remains at this decision. If a reboot has been reinitiated, the process advances to the decision 211 where a determination is made as to whether the operational support system services has cleared the "pirate flag" by means of a INADS login and password. If the operational support system services has not cleared the freeze in decision 211 and the PBX switch is rebooted manually at decision 210, the effect on the PBX switch is that the process returns only to decision 209 and the administration capabilities remain frozen. Once this flag is cleared, the PBX switch resumes normal processing and resides in the state shown as step 204 barring any power loss or voluntary reinitialization.

Whenever the administration capabilities are frozen by the process, they may be released by the same operational support system privileged login for causing the PBX switch to resume normal processing. Once the administration capabilities are in the frozen state, any power loss or reinitialization of the PBX switch results in the continuation of the frozen administration state.

Flexibility is employed in selecting the indicators that will activate the pirate flag and generate the freeze of the administration capabilities. A change in area code is used by the process as a first standard independent indicator for generating the freeze of the administration capabilities. A change in the dial plan provides a second standard independent indicator for use by the process for generating the freeze of the administration capabilities. If either of these indicators are true, which suggest that the PBX switch has been located minimally in a different central office serving area, the freeze of the administration capabilities will occur with the normal initialization or rebooting of the PBX switch in this new serving area.

To allow for the desired flexible operation in, by way of example, metropolitan areas where area code change periodically, the process advantageously may be configured to freeze the administration capabilities only when both indicators, i.e., the change in area code and the change in dial plan, are true.

To also facilitate flexibility in the permitted operations within the PBX switch, selected local administrative operations either may be made a part of the changes that are included in the pirate signature or excluded from these changes. The process thus allows legitimate customers to make some selected and prearranged administrative operational changes without requiring these customers to contact the operational support system personnel for INADS services. If, for example, there is a need for the customer to frequently move individual extensions around in the location served by the PBX switch, then such movement may optionally not be made part of the signature and therefore will not trigger the pirate flag. Thus the signature may be made as sensitive or insensitive as felt reasonably appropriate to safeguard against software piracy.

Other factors such as the complexity of the customized software and therefore the likelihood of a wrongful user being interested in acquiring the software also may be considered when assigning the indicators which will generate the administration freeze of the software. The customized software that is used for configuring a just-introduced PBX switch, for example, would include more indicators for generating the freeze of the administration capabilities than customized software that is used for configuring a PBX switch that is typically 15 to 20 years old. Each switch, however, may have the same safeguards incorporated in the pirate signature as desired, in accordance with the invention.

Various modifications of this invention are contemplated and may obviously be resorted to by those skilled in the art without departing from the spirit and scope of the invention as hereinafter defined by the appended claims.

We claim:

1. A method of restricting execution of a program on a private branch exchange switch to a particular location for the private branch exchange switch, the method comprising the steps of:
   storing at least a first indicator in software in the private branch exchange switch, the first indicator being unique to a particular service area provided by a central office;
   receiving at least a second indicator in the software, the second indicator being reflective of the private branch exchange switch operating in the service area provided by the central office;
   comparing said stored first indicator with said received second indicator in the software during the execution of said program; and
   preventing further execution of said program on said private branch exchange switch when said stored first indicator in the software compares unfavorably with said received second indicator.

2. The method of restricting execution of a program as in claim 1 further comprising the step of providing an alerting signal in the private branch exchange switch when said stored first indicator in the software compares unfavorably with said received second indicator.

3. The method of restricting execution of a program as in claim 2 further comprising the step of inhibiting the preventing step for a predetermined time period, the inhibiting step providing a preset time period after which further execution of said program on said private branch exchange switch is prevented.

4. The method of restricting execution of a program as in claim 1 wherein said program controls the configuring of the administration capabilities of the private branch exchange switch.

5. The method of restricting execution of a program as in claim 4 wherein the preventing step prevents further execution of said program on said private branch exchange, the preventing step freezing the administration capabilities in the private branch exchange switch.

6. The method of restricting execution of a program as in claim 5 further comprising the step of resetting the preventing step, responsive to the resetting step, the preventing step allowing full execution of said program on said private branch exchange switch.

7. The method of restricting execution of a program as in claim 5 wherein the resetting step is provided remote to the private branch exchange switch.

8. The method of restricting execution of a program as in claim 5 wherein the resetting step is provided at the private branch exchange switch.

9. A software security system for restricting execution of a program on a private branch exchange switch to a particular location for the private branch exchange switch, the security system comprising:
   means for storing at least a first indicator in software in the system, the first indicator being unique to a particular service area provided by a central office;
   means for receiving at least a second indicator in the software, the second indicator being reflective of the private branch exchange switch operating in the service area provided by the central office;
   means responsive to the storage means and the receiving means for comparing said stored first indicator with said received second indicator in the software during the execution of said program; and
   means responsive to said comparing means for preventing further execution of said program on said private branch exchange switch when said stored first indicator in the software does not compare favorably with said received second indicator.

10. The software security system of claim 9 further comprising alerting means responsive to said comparing means for providing an alerting signal in the private branch exchange switch when said stored first indicator in the software does not compare favorably with said received second indicator.

11. The software security system of claim 10 further comprising timer means for inhibiting the prevention means for a predetermined time period, said timer means providing a preset time period after which the preventing means prevents further execution of said program on said private branch exchange switch.

12. The software security system of claim 9 wherein said program controls the configuration of the administration capabilities of the private branch exchange.

13. The software security system of claim 12 wherein the preventing means prevents further execution of said program on said private branch exchange, the preventing means freezing administrative capabilities in the private branch exchange switch.

14. The software security system of claim 12 further comprising means for resetting the preventing means, responsive to the resetting means, the preventing means allowing full execution of said program on said private branch exchange switch.

15. The software security system of claim 12 wherein the stored first indicator is a dialing plan unique to a particular service area and the received second indicator is a dialing plan reflective of the private branch exchange switch operating in the service area provided by the central office.

16. The software security system of claim 15 further comprising a stored third indicator and a received fourth indicator, the stored third indicator is an area code unique to a particular service area and the received fourth indicator is a area code reflective of the private branch exchange switch operating in the service area provided by the central office.

17. A software security system for restricting execution of a program on a private branch exchange switch to a particular location for the private branch exchange switch, the security system comprising:

means for retaining a set of stored indicators in software in the system, the set of stored indicators comparing favorably to a set of received indicators provided to the software by the private branch exchange switch while operating in a particular service area provided by a central office;

means for determining the presence of the set of received indicators in the software during the execution of said program; and means, responsive to said determining means, for preventing further execution of said program on said private branch exchange switch when said set of received indicators in the software compares unfavorably with said set of stored indicators being used for operating in the service area provided by the central office.

18. The software security system of claim 17 further comprising means for providing an alerting signal in the private branch exchange switch when said set of received indicators in the software compares unfavorably with said set of stored indicators being used for operating in the service area provided by the central office.

19. The software security system of claim 18 further comprising timer means for controlling actuation of the prevention means, said timer means delaying the actuation of the prevention means by providing a preset time period after which the preventing means prevents further execution of said program on said private branch exchange switch.

20. The software security system of claim 17 wherein said program controls the configuration of the administration capabilities of the private branch exchange.

21. The software security system of claim 20 wherein the preventing means prevents further execution of said program on said private branch exchange, said preventing means freezing administrative capabilities in the private branch exchange switch.

22. The software security system of claim 20 further comprising means for resetting the preventing means, responsive to the resetting means, the preventing means allowing full execution of said program on said private branch exchange switch.

23. The software security system of claim 22 wherein the resetting means is provided remote to the private branch exchange switch.

24. The software security system of claim 22 wherein the resetting means is provided at the private branch exchange switch.

25. A software security system for restricting execution of a program on an apparatus to a particular location for the apparatus, the security system comprising:

means for storing at least a first indicator in software in the system, the first indicator being unique to a particular service area provided by a central office;

means for receiving at least a second indicator in the software, the second indicator being reflective of the apparatus operating in the service area provided by the central office;

means responsive to the storage means and the receiving means for comparing said stored first indicator with said received second indicator in the software during the execution of said program; and means responsive to said comparing means for preventing further execution of said program on said apparatus when said stored first indicator in the software does not compare favorably with said received second indicator.

* * * * *